United States Patent
Savioz

(10) Patent No.: US 10,329,135 B2
(45) Date of Patent: Jun. 25, 2019

(54) ANTI-DRIPPING SYSTEM

(71) Applicant: NESTEC S.A., Vevey (CH)

(72) Inventor: Gregory Savioz, Saxonne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/752,325

(22) PCT Filed: Aug. 15, 2016

(86) PCT No.: PCT/EP2016/069354
§ 371 (c)(1),
(2) Date: Feb. 13, 2018

(87) PCT Pub. No.: WO2017/029267
PCT Pub. Date: Feb. 23, 2017

(65) Prior Publication Data
US 2018/0237283 A1    Aug. 23, 2018

(30) Foreign Application Priority Data

Aug. 17, 2015 (EP) .................................. 15181228

(51) Int. Cl.
*B67D 1/12* (2006.01)
*B67D 1/00* (2006.01)
(Continued)

(52) U.S. Cl.
CPC ........ *B67D 1/1256* (2013.01); *A47J 31/4485* (2013.01); *A47J 31/46* (2013.01); *A47J 43/127* (2013.01); *B67D 1/0018* (2013.01)

(58) Field of Classification Search
CPC ...... B67D 1/1256; A47J 31/4485; A47J 31/46
(Continued)

(56) References Cited

U.S. PATENT DOCUMENTS 8,561,841 B2 * 10/2013 Erman .................. A47J 31/402
222/135
8,678,244 B2 * 3/2014 Yang .................... A47K 5/1202
222/321.9
(Continued)

FOREIGN PATENT DOCUMENTS

CA         2896144       3/2008
WO         2006005401    1/2006
WO         2014096183    6/2014

*Primary Examiner* — Vishal Pancholi
(74) *Attorney, Agent, or Firm* — K&L Gates LLP

(57) ABSTRACT

Anti-dripping system for a beverage dispensing device (100), the device comprising a container compartment (20) where a fluid (1) is stored, an air entry (13) through which air can be provided into the device (100) and a processing compartment (10) where fluid optionally together with air is pumped and possibly foamed, the processing compartment (10) comprising a pumping element (11) for pumping fluid and possibly air and a foaming element (12) for foaming fluid and air; the pumping element (11) comprising two moveable parts with respect to each other arranged in such a way that their relative movement in a certain direction pumps fluid by suction from the container compartment (20) and optionally also air from the air entry (13) respectively into the processing compartment (10); the foaming element (12) comprising at least a movable part and a static part movable with respect to each other, said parts driving the fluid optionally together with air through a gap (123) providing a certain level of shear stress which allows mixing and/or foaming, the pumping element (11) being configured to reverse the direction of the relative movement of the moveable parts after each dispensing operation so that any remaining fluid not dispensed is sent back to the container compartment (20) thus avoiding dripping.

20 Claims, 3 Drawing Sheets

(51) Int. Cl.
*A47J 31/44* (2006.01)
*A47J 31/46* (2006.01)
*A47J 43/12* (2006.01)

(58) Field of Classification Search
USPC .............................. 222/146.2, 108–110, 571
See application file for complete search history.

(56) References Cited

U.S. PATENT DOCUMENTS

| | | | | |
|---|---|---|---|---|
| 2004/0050875 | A1* | 3/2004 | Kobayashi | G01F 11/10 222/333 |
| 2007/0272317 | A1* | 11/2007 | Klopfenstein | B67D 1/0031 137/889 |
| 2008/0203591 | A1* | 8/2008 | Pelfrey | A47K 5/16 261/28 |
| 2008/0277421 | A1* | 11/2008 | Zlatic | A47K 5/16 222/136 |
| 2011/0114669 | A1* | 5/2011 | Yang | A47K 5/16 222/52 |
| 2011/0143006 | A1* | 6/2011 | Douma | A47J 31/4485 426/474 |
| 2012/0285992 | A1* | 11/2012 | Ciavarella | F04C 13/00 222/138 |

* cited by examiner

ANTI-DRIPPING SYSTEM

CROSS REFERENCE TO RELATED APPLICATIONS

The present application is a National Stage of International Application No. PCT/EP2016/069354, filed on Aug. 15, 2016, which claims priority to European Patent Application No. 15181228.6, filed on Aug. 17, 2015, the entire contents of which are being incorporated herein by reference.

FIELD OF THE INVENTION

The present invention is directed to an anti-dripping system used in a beverage dispensing device, particularly in a device for pumping and/or foaming a fluid, preferably milk.

BACKGROUND OF THE INVENTION

An important challenge affecting beverage dispensing systems is the dripping observed after each beverage preparation, which results in a soiled drip tray. The phenomenon is generally accepted for coffee machines for example and other products that are not affected by temperature and air contact. However, the case is definitely different when it comes for instance to milk where bacteria quickly multiply resulting in unpleasant odours and non-hygienic conditions. The simplest solution used in the state of the art for these cases consists in the use of a drip tray to collect the drops but it requires a cleaning after each beverage cycle which represents a hassle for the user.

Many beverage dispensing systems used at present provide foamed beverages. Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Dealing with milk foam has very high hygienic constraints so it becomes extremely important to clean the parts of the device very frequently and avoid that milk is left in the device for a further use of it.

Some other solutions have been provided to allow the production of foaming fluids, for example the one provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. Providing a cleaning of the system before a further use is also particularly relevant here.

There also exist well known foaming devices in the state of the art which use steam to foam via a Venturi effect, such as for example the devices shown in EP 2695556 A1 or in EP 2636343 A1. Document EP 2695556 A1 discloses a device for preparing heated milk foam having a suction device comprising a mixing chamber with vapour and milk, such that this mixture is suctioned through utilizing Venturi effect, so that milk foam is provided. Another example is provided in document EP 2636343 A1, where a device for producing heated milk foam is described: this device uses a narrowing nozzle, particularly a Venturi nozzle, for obtaining a suction effect of milk and vapour, in order to produce milk foam. However, even when hot steam can kill most of the bacteria in the fluid, typically milk, these known systems using the Venturi effect are not operated in a clean way, as milk is repeatedly in contact with the device which not only imposes often cleaning but which can also be a source of product contamination. Moreover, these systems cannot retrieve the milk remaining in the system after use, which creates problems of hygiene and also of dripping.

In these known beverage dispensing systems providing foamed beverages, a solution for avoiding dripping and spoiling the drip tray consists in using elastomeric valves at the product outlet. However, this solution presents also drawbacks: on the one hand, the valve represents an additional cost for the system and, on the other hand, the valve functioning requires that the product exceeds a pressure threshold, and this threshold can possibly disrupt the fluidic behaviour of the product upstream, especially when foaming is involved. Moreover, there is still fluid (particularly milk) remaining in the pipes or conducts through which it has circulated which can be spoiled after a very short time which will create important hygienic issues. Even more, cleaning of the valve is very complicated and is hard to do in a proper way.

For example, documents CN 203406370 U, CN103441234 or CN103413913 of the prior art propose solutions to avoid dripping on liquid injection devices, comprising a mechanical closing of a valve using a vacuum chamber. The problem of such solution is that vacuum can take some time to be set and, moreover, there is still the problem of the liquid remaining in the tubes which can be particularly problematic with milk.

Document US20050150911 discloses the addition of a one way valve at the end of the dispensing tube, so a back pressure is created using the mechanical properties of the valve itself and this avoids final dripping in dispensing. However, no removal of the remaining liquid inside the system is achieved so there is still the problem of hygiene previously described.

In U.S. Pat. No. 4,905,744 a piston is used to create a back pressure for anti-dripping. In CN101403445 a model of mechanical valve that avoids dripping by closing the path using an actuated piston is disclosed. However, in none of these documents, the tubing is emptied from remaining liquid so hygiene is guaranteed.

The present invention aims at providing an anti-dripping system for a beverage dispensing device solving the drawbacks of the known prior art as it will be further explained in more detail.

SUMMARY OF THE INVENTION

According to a first aspect, the invention refers to an anti-dripping system for a beverage dispensing device, the device comprising a container compartment where a fluid is stored, an air entry through which air can be provided into the device and a processing compartment where fluid optionally together with air is pumped and possibly foamed.

The processing compartment comprises a pumping element for pumping fluid and possibly air and a foaming element for foaming fluid and air. The pumping element comprises two moveable parts with respect to each other arranged in such a way that their relative movement in a certain direction pumps fluid by suction from the container compartment and optionally also air from the air entry respectively into the processing compartment. The foaming element comprises at least two parts moveable with respect to each other, preferably a movable part movable with respect to the static part, said parts driving the fluid optionally together with air through a gap providing a certain level of shear stress which allows mixing and/or foaming. The pumping element is configured to reverse the direction of the relative movement of the moveable parts after each dispensing operation so that any remaining fluid not dispensed is sent back to the container compartment thus avoiding dripping.

Preferably, the gap is formed between a moveable part and a static part of the processing compartment, the moveable part being arranged to rotate relative to the static part and the parts being arranged substantially parallel and/or concentrically to each other.

Preferably, the foaming element comprises an inner disc or a cylinder rotating within a static outer chamber under a common rotation axis.

According to a preferred embodiment, the pumping element comprises pumping gears that, when rotate, pump fluid from the container compartment and optionally also air from the air entry into the processing compartment. Preferably, the pumping gears comprise a driver gear entraining in rotation a driven gear, such that the driver gear is typically solidary with the movable part of the foaming element.

Preferably, the anti-dripping system further comprises a one-way valve allowing entry of air into the device when the pumping element rotates in the direction allowing the dispensing mode, the valve preventing any fluid and/or air to go through when the pumping element reverses rotation.

Typically, the gap has a width comprised in a range from 0.2 mm to 1 mm, preferably in the range from 0.3 mm to 0.5 mm.

Preferably, the processing compartment is configured as a disposable lid and the container compartment is configured as a multi-dose container such as a bottle or pouch or as a single-dose container such as a capsule, sachet or pad.

According to another embodiment, the processing compartment and/or the container compartment can be configured reusable and cleanable.

Typically, the fluid in the container compartment is a food or beverage liquid such as milk, or a foamable fluid such as cream, yoghurt, ice-cream liquid mix, non-dairy product or mix, for example.

According to a second aspect, the invention further refers to a beverage system comprising a beverage dispensing device with an anti-dripping system as the one described, comprising driving means driving in rotation the pumping element and/or the foaming element.

Preferably, the beverage system comprises an air inlet through which air is introduced in the device, further comprising an adjustable valve controlling the amount of air introduced.

Typically, the beverage system of the invention further comprises a heating device heating the fluid or the foamed fluid before it is dispensed, the heating device preferably comprising a steam exchanger, or a conduction, radiation with infrared or halogen lamps, hot air or induction heating device.

Preferably, the beverage system of the invention further comprises control means to control process parameters in the beverage dispensing device.

Optionally, the beverage system further comprises an air pump providing air into the device as a function of the voltage applied to the pump.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

The present invention is directed to an anti-dripping system used in a beverage dispensing device 100: preferably, the dispensing device 100 pumps and optionally also foams a fluid, typically milk. Preferably, the device 100 is operated by a beverage dispensing machine 200, as it will be further explained in more detail.

Figure 3:
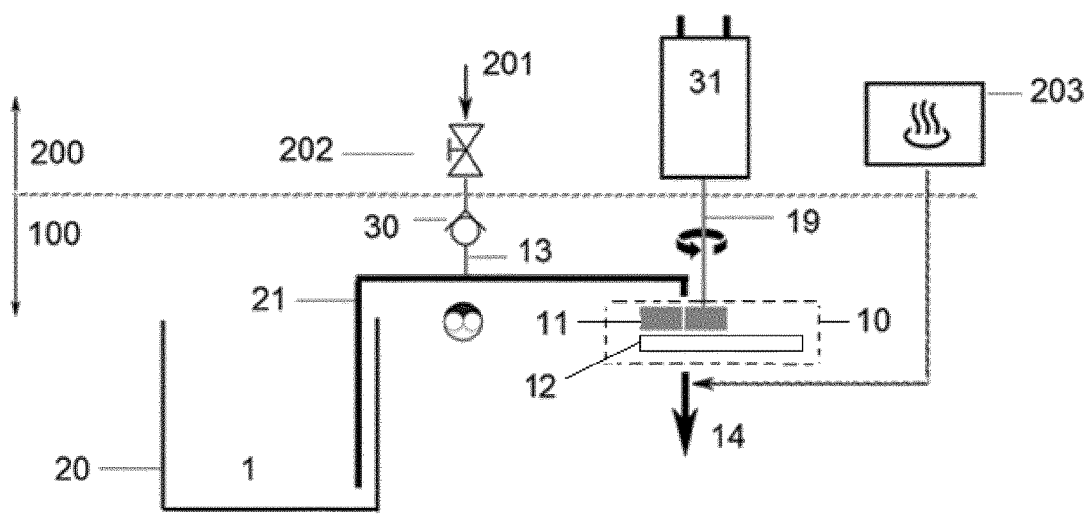
FIG. 3 shows a schematic representative functional view of the beverage dispensing device where the anti-dripping system of the present invention is integrated, also showing the beverage dispensing machine operating such a device.

Referring to FIG. 3, a beverage dispensing device 100 on demand is shown connected to a beverage dispensing machine 200 according to the present invention.

Figure 1:
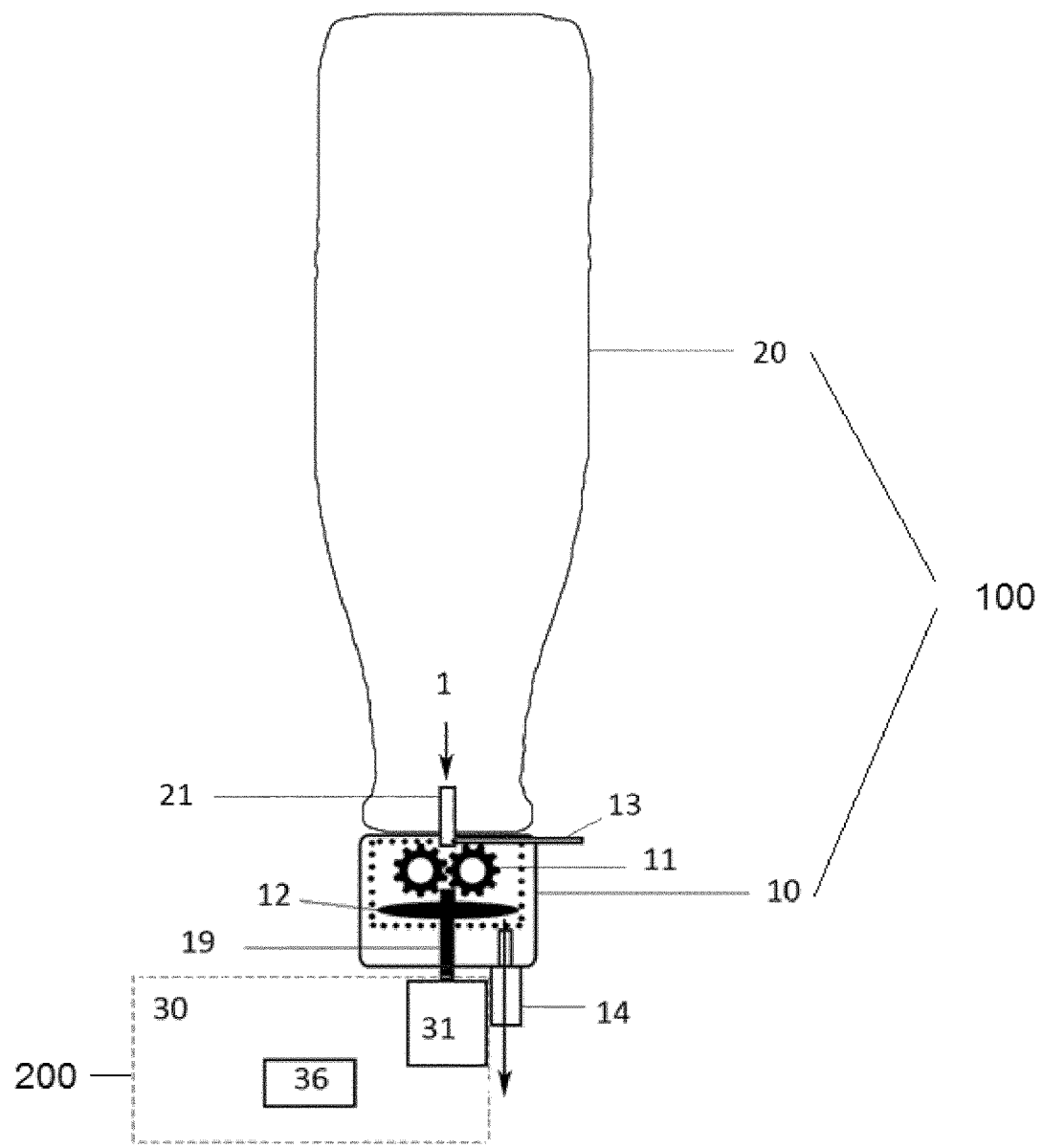
FIG. 1 shows a schematic view of the beverage dispensing device where the anti-dripping system of the present invention is integrated, also showing the beverage dispensing machine operating such a device.

The device part will be now explained in detail in what follows. An example of a beverage dispensing device 100 comprising an anti-dripping system according to the invention is shown in FIG. 1. The device 100 comprises a processing compartment 10 and a container compartment 20. The container compartment 20 comprises a fluid 1 that will be pumped and possibly also foamed, and the processing compartment 10 is consequently designed for pumping the fluid 1 from the container compartment 20 and optionally for foaming it. Typically, the fluid 1 processed in the device 100 of the invention is preferably a food or beverage liquid such as milk, though any kind of foamable fluid can be used, such as cream, yoghurt, ice-cream liquid mix, non-dairy products or mixes, etc. In a preferred embodiment of the invention, the processing compartment 10 is configured as a lid or cap and the container compartment 20 can be configured as a multi-dose container such as bottle or pouch or as a single-dose container such as a capsule or small sachet or pad. However, it is clear that any other possible embodiment of the invention would also be comprised within the scope of the present patent application and within the scope of the attached claims.

Preferably, the beverage dispensing device 100 of the invention is fully disposable, so no cleaning operations are needed: typically, it allows a plurality of pumping and optionally also foaming operations until the container compartment 20 has been emptied of fluid 1. Optionally, the device 100 can be cleanable and therefore can be reusable a plurality of times.

Figure 2A:
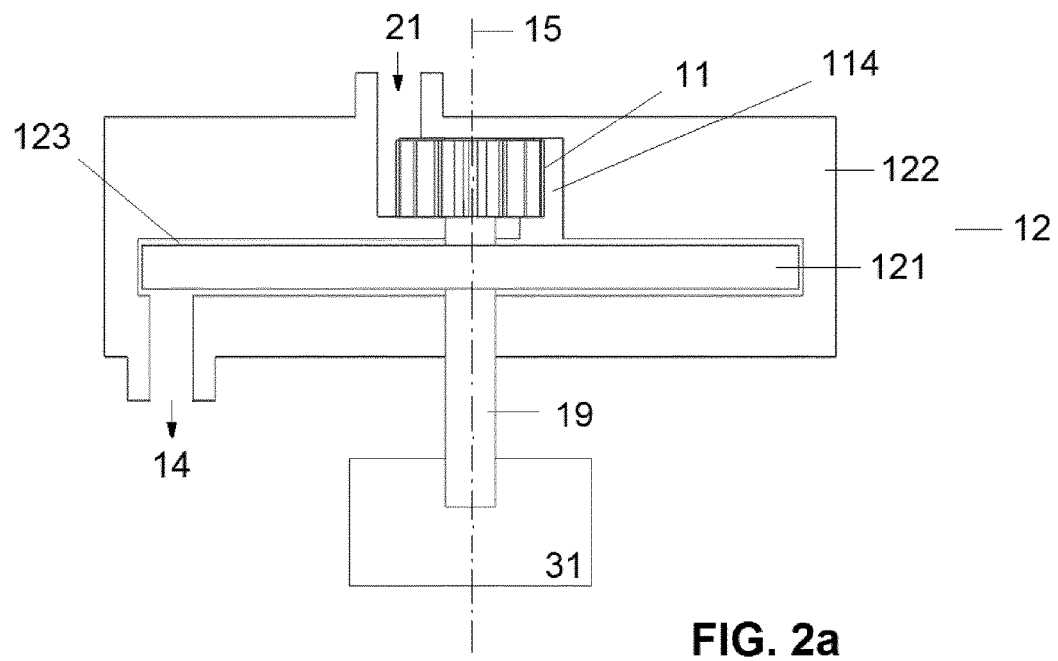
FIGS. 2a-b show detailed views of the pumping gears and foaming element according to a preferred embodiment in a beverage dispensing device where the anti-dripping system of the present invention is integrated.
Figure 2B:
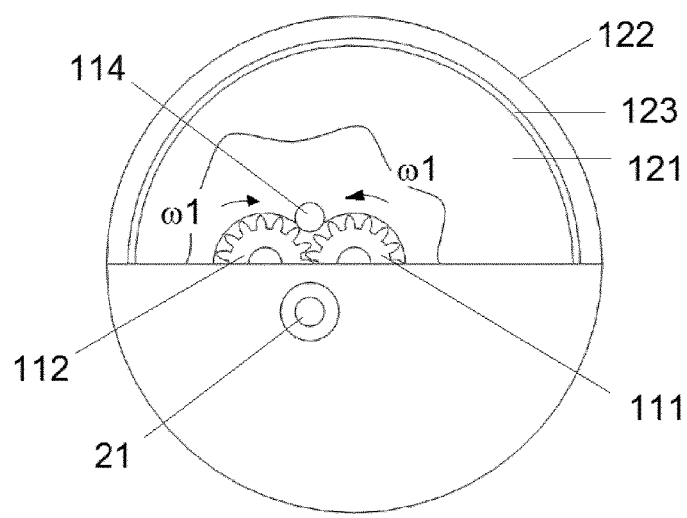

Typically, the processing compartment 10 comprises pumping gears 11 and a foaming element 12. The foaming element 12 is preferably based on the couette-flow effect, and it comprises a movable part 121 rotating within an external surrounding static part 122, such that a gap 123 is formed between these two parts, the fluid being foamed in such a gap, as shown in FIG. 2a. Typically, the movable part 121 is configured as a disc or it can also be configured as a cylinder, and the static part 122 is configured as an outside chamber surrounding the inner rotating disc, both parts being concentrically arranged with respect to a common rotation axis 15, as shown in FIGS. 2a and 2b. However, other configurations are also possible and are comprised within the scope of the present invention. Pumping gears as depicted in the attached Figures are the preferred embodiment of the invention; however, any other possible configuration allowing pumping using different devices and/or shapes will also be comprised in the scope of the present invention.

The width of the gap 123 is chosen depending on the type of fluid in the container compartment 20 which is to be foamed, chosen in such a way that optimal foaming effect by shear (Couette flow) is obtained. The gap 123 has typically a width comprised in a range from 0.2 mm to 1 mm, preferably in the range from 0.3 mm to 0.5 mm.

The pumping gears 11 preferably comprise two gears, a driver gear 111 and a driven gear 112. The processing compartment 10 also comprises an air entry 13 arranged in such a way that the rotation of the pumping gears 11, arranged after the container compartment 20, creates a suction effect of the fluid 1 comprised in the container compartment 20 optionally together with air coming from the air entry 13. The fluid or the fluid together with air are pre-mixed by being entrained and driven together through the pumping gears 11, before entering the foaming element 12. Besides, some foaming can be achieved in the fluid when it passes through the pumping gears 11.

More in detail, as shown in FIG. 2b (where a sectional inside cut is shown for clarity), when the driver gear 111 is rotated, it drives in rotation in opposite sense the driven gear 112, such that two areas are created in the pumping gears 11: a suction area 21 where fluid 1 and optionally air from the air entry 13 are sucked, and a pushing area 114 where the sucked fluid 1 and possibly air are pre-mixed and are driven towards the foaming element 12. In this process, the fluid optionally together with air is actually pre-mixed before entering the foaming element 12.

The driver gear 111 and the driven gear 112 in the pumping gears 11 can be of the same diameter or of different diameters, then having different rotational speeds.

Once in the foaming element 12, particularly once in the gap 123, the mixture of fluid and air is passed by Couette flow: Couette flow refers to a laminar flow of a viscous fluid in the space between two parallel plates, such that one plate is moving relative to the other; the flow is driven by shear force acting on the fluid comprised between the two plates; this way, foaming energy is provided through high shear energy to the fluid, which is emulsified. According to the invention, the pre-mixture of fluid and air is driven by shear stress in the gap 123, as the disc 121 rotates with respect to the static outer chamber 122. The shear stress provided to the mixture of fluid and air in the gap 123 allows decreasing the size of the air bubbles comprised within the structure of the fluid, so that these bubbles can be more efficiently trapped within the fluid matrix, which highly increases the stability of the foam obtained. Foam is provided through a fluid outlet 14.

The device 100 of the invention can provide either only fluid (typically milk), hot or cold, not foamed, or it can provide said fluid foamed. When the fluid will be foamed, rotation of the pumping gears 11 will suck both fluid from the container compartment 20 and air through the air entry 13. The amount of air sucked is regulated in fact by the rotational speed of the pumping gears 11 but mainly by the opening size of the air entry 13. As it will be further explained in more detail when referring to FIG. 3, the air entry 13 is connected to the fluid inlet 21 through an adjustable valve 202 that can in fact regulate the opening ratio of the air entry 13 (totally open, ¾ open, ½ open, ¼ open or completely closed, typically, though finer opening adjustments are also possible). The amount of air introduced together with the fluid determines the thickness of the foam produced in the device 100. As previously explained the mixture of fluid and air is first mixed by passing through the pumping gears 11 and is then foamed by being entrained through the foaming element 12.

When no foaming is intended and only fluid shall be dispensed from the device 100, the air entry 13 remains closed by means of the adjustable valve 202, so no air is sucked, only fluid, by the rotation of the pumping gears 11. Similarly, the fluid is mixed when passing through the pumping gears 11 and is further mixed when being entrained through the foaming element 12.

According to the invention, and as shown in FIG. 2a and FIG. 2b, the driver gear 111 and the foaming element 12 are solidary, so they rotate together.

The processing compartment 10 is connectable to driving means 31 (preferably a motor) through connecting means 19, typically comprising a shaft, as represented in FIG. 1: the driving means 31 rotate the inner disc 121 with respect to the outer chamber 122, at a given rotational speed $\omega_1$. Because the disc 121 and the driver gear 111 are mechanically connected, the driving means 31 also entrain in rotation at the same time the driver gear 111 which rotates at the same rotational speed $\omega_1$ which thus rotates the driven gear 112 with a rotational speed $-\omega_1$ (see FIGS. 2a and 2b). Therefore, with the same rotation w provided by the driving means 31, two effects are obtained: the pumping or sucking effect of the fluid and optionally air by the rotation of the pumping gears 11, and the foaming effect, with the rotation of the inner disc 121 with respect to the outer chamber 122 when air is also sucked (that is, when the air entry 13 is open a certain degree): the process is thus made very efficiently. Preferred values of the rotational speed $\omega_1$ of the disc 121 and of the pumping gears 11 are comprised between 2000 and 10000 rpm, preferably between 3000 and 7000 rpm.

The machine part comprises the driving means 31, preferably a motor, actuating in rotation the pumping gears 11 (specifically, rotating the driver gear 111 which rotates the driven gear 112). Moreover, the machine part further comprises an air inlet 201 connected to the air entry 13 in the device 100 by means of an adjustable valve 202. The amount of air sucked by the rotation of the pumping gears (together with the fluid 1 coming from the container 20) can be adjusted by the size of the air entry 13 in the device 100 and by the rotational speed of the pumping gears 11: however, a preferred execution for the adjustment of the amount of air introduced is done through an adjustable valve 202, as represented in FIG. 3. The adjustment of the amount of air introduced in the device 100 allows the regulation of the thickness of the foam that will be provided through the fluid outlet 14. The complete closing of the air entry 13 is also possible, when no foaming is intended, as already explained.

Optionally, the beverage dispensing machine 200 can also comprise control means 36 (shown schematically only in FIG. 1) that will manage and control the process parameters in the beverage dispensing device 100. As an alternative, it is also possible that the machine 200 comprises no control means 36, meaning that the user will then adjust manually part or all of the parameters of the process in the device 100.

Optionally, the beverage dispensing machine 200 can further comprise an air pump (not shown) connectable to the air inlet 201 and providing air through the air inlet 201, typically as a function of the voltage applied to this air pump. A regulator can also be provided in the connection of the air pump with the air inlet 201, improving the control of the foaming.

Also optionally, the beverage dispensing machine 200 can further comprise a heating device 203 preferably connected to the fluid outlet 14 to optionally heat the fluid or the foam before it is dispensed: in this way, there is no contact between the fluid and/or foam and the machine 200. The heating device 203 can comprise a steam generator, typically a thermoblock and a pump, and a steam exchanger for dispensing steam in the device 100 or through the fluid outlet 14 or it can comprise other heating means, such as conduction, radiation with infrared or halogen lamps, hot air, induction or the like, for example.

The beverage dispensing device 10 further comprises an anti-dripping system functioning as it will be explained now.

In standard dispensing operation of a fluid or a foamed fluid, the motor rotates in a certain direction (as shown for example by an arrow in FIG. 3) actuating in rotation the pumping gears 11: the rotation of the pumping gears 11 sucks fluid through the fluid inlet 21 from the container 20, optionally together with air that is introduced in the device through the air entry 13 coming from the air inlet 201 and controlled by the adjustable valve 202, when foaming of the fluid is intended. The mixture of fluid and air is then subjected to Couette Flow effect as explained before: the foamed fluid is then delivered through the fluid outlet 14, optionally being heated by means of the heating device 203.

After each dispensing operation of a fluid or of a foamed fluid, the pumping gears 11 reverse rotation direction (in fact, the driving means 31 reverse its rotation and thus, that of the pumping gears 11): with this, the gears in the pumping gears 11 rotate in opposite direction and, instead of sucking fluid (optionally together with air) from the container 20, any fluid remaining in the tubing (fluid inlet 21, pumping gears 11, foaming element 12 and fluid outlet 14) after the dispensing is sent back into the container compartment 20. As shown in FIG. 3, a check valve 30 is provided in the air entry 13: this valve is typically a one-way valve that allows air (when foaming is intended) enter in the line 21 when fluid is sucked from the container 20 (and therefore when dispensing operation is done) but which prevents that the remaining fluid that is pumped back into the container 20 when the driving means 31 reverse its rotation do enter the machine 200 through the air inlet 201.

The proposed solution according to the invention takes advantage of gear pump elements used in beverage dispensing devices 100 of the type disclosed previously: an inversion of the direction of rotation of the motor (driving means 31) driving the pumping gears 11 is performed after each beverage dispensing so as to pump the residual product contained in the tubing back in the container compartment and so avoid dripping. The cleanliness of the system is thus improved and so is the hygiene as the amount of residual product representing a microbiological threat is strongly decreased. The fact of pumping the residual product back in the main container also increases microbiological safety because the small quantity of residual product is mixed with a larger quantity of product that stayed at a lower temperature in the main container 20 (typically, the device 100 is kept in a refrigerator between one use and the other). The addition of the check valve 30 on the air inlet (air necessary for foaming), just before the product pipe (fluid inlet line 21) is required to avoid any backflow of product in the machine.

As already explained, the pumping gears 11 together with the foaming element 12 need to rotate at a certain speed that allows sucking of milk from the container 20 and optionally also of air from the air inlet 13, allowing at the same time the mixing and optionally the foaming of fluid (when optionally entraining also air) when entrained through the pumping gears 11 and the foaming element 12. When the direction of rotation of the driving means 31 is reversed (therefore that of the shaft 19), looking at FIG. 3, it is intended to send back to the container compartment 20 the fluid remaining in the processing compartment 10, in the fluid outlet 14 and in the fluid inlet line 21: typically, this is done by rotating in opposite direction the pumping gears 11 and the foaming element 12. Typically, rotation values are comprised between 2000 and 10000 rpm, preferably between 3000 and 7000 rpm, the same ones as for the pumping and foaming action; however, not necessarily the same values have to be maintained for this backward-pumping.

Looking again at FIG. 3, when rotation of the driving means 31 is inversed for the anti-dripping function, the adjustable valve 202 is closed if possible (when automatically actuated, it will be typically closed; when manually actuated, however, it can remain open so the user does not need to close it and still the system will work properly with the reverse pumping anti-drip function): the check valve 30 prevents fluid (optionally also air) from entering the machine 200, so the remaining fluid and air in the tubing (processing compartment 10, fluid outlet 14 and fluid inlet line 21) are pumped back into the container compartment 20.

Another possible embodiment of the device 100 of the invention comprises only the adjustable valve 202, but no check valve 30: when rotating in reverse direction for the anti-dripping function, the valve 202 will be closed and the air and fluid in the tubing will be pumped back into the container 20. Because fluid is mostly remaining in the outlet 14 and some in the processing compartment 10, when pumping back, the air contained between the fluid inlet line 21 and the adjustable valve 202 creates a kind of "cushion" that is stopped by the valve 202 being closed, so this air cushion is in fact preventing any fluid from going into the machine 200, as it is retained by air.

Another possible embodiment of the device 100 would be to provide only the check valve 30, and no adjustable valve 202: the one-way valve 30 would then prevent fluid (possibly together with air) from entering into the machine 200, so it will be diverted into the container 20.

Further advantages of the invention are that there is no dripping after use of the system, so no drip-tray is therefore needed which makes the device easier to manipulate and to clean, the system being made very efficient.

Although the present invention has been described with reference to preferred embodiments thereof, many modifications and alterations may be made by a person having ordinary skill in the art without departing from the scope of this invention which is defined by the appended claims.

The invention claimed is:

1. An anti-dripping system for a beverage dispensing device, the anti-dripping system comprising:
   a container compartment where a fluid is store;
   an air entry through which air can be provided into the anti-dripping system; and
   a processing compartment comprising a pumping element for pumping the fluid and a foaming element for foaming the fluid, the foaming element being positioned within the processing compartment,
   the pumping element comprising two parts moveable with respect to each other arranged such that a relative movement of the two parts in a direction pumps the fluid by suction from the container compartment into the processing compartment, the pumping element configured to reverse the direction of the relative movement of the two parts after each dispensing operation, so that any remaining fluid not dispensed is sent back to the container compartment thus avoiding dripping,
   the foaming element comprising at least a movable part and a static part movable with respect to each other and driving the fluid through a gap providing a certain level of shear stress which allows mixing and/or foaming.

2. The anti-dripping system according to claim 1, wherein the gap is formed between the moveable part and the static part of the foaming element, the moveable part arranged to rotate relative to the static part, and the moveable part and the static part arranged substantially parallel and/or concentrically to each other.

3. The anti-dripping system according to claim 1, wherein the foaming element comprises an inner disc or a cylinder rotating within a static outer chamber under a common rotation axis.

4. The anti-dripping system according to claim 1, wherein the pumping element comprises pumping gears that, when rotate, pump the fluid from the container compartment.

5. The anti-dripping system according to claim 4, wherein the pumping gears comprise a driver gear entraining in rotation a driven gear, such that the driver gear is solidary with the movable part of the foaming element.

6. The anti-dripping system according to claim 1 comprising a one-way valve allowing entry of the air into the anti-dripping system when the pumping element rotates in a direction allowing a dispensing mode, the one-way valve preventing the fluid and/or the air from going through when the pumping element reverses rotation.

7. The anti-dripping system according to claim 1, wherein the gap has a width of from 0.2 mm to 1 mm.

8. The anti-dripping system according to claim 1, wherein the processing compartment is configured as a disposable lid, and the container compartment is configured as a multi-dose container.

9. The anti-dripping system according to claim 1, wherein the processing compartment and/or the container compartment are configured reusable and cleanable.

10. A beverage system comprising:
    a beverage dispensing device with an anti-dripping system comprising
    a container compartment where a fluid is stored,
    an air entry through which air can be provided into the anti-dripping system,
    a processing compartment comprising a pumping element for pumping the fluid and a foaming element for foaming the fluid, the foaming element being positioned within the processing compartment, and
    a driver driving in rotation the pumping element and the foaming element,
    the pumping element comprising two moveable parts moveable with respect to each other arranged such that a relative movement of the two parts in a direction pumps the fluid by suction from the container compartment into the processing compartment, the pumping element configured to reverse the direction of the relative movement of the two parts after each dispensing operation, so that any remaining fluid not dispensed is sent back to the container compartment thus avoiding dripping, and
    the foaming element comprising at least a movable part and a static part movable with respect to each other and driving the fluid through a gap providing a certain level of shear stress which allows mixing and/or foaming.

11. The beverage system according to claim 10 comprising an air inlet through which the air is introduced in the anti-dripping system and further comprising an adjustable valve controlling an amount of the air introduced.

12. The beverage system according to claim 10 comprising a heating device configured to heat the fluid or a foamed fluid before the fluid or the foamed fluid is dispensed.

13. The beverage system according to claim 10 comprising a controller configured to control process parameters in the beverage dispensing device.

14. The beverage system according to claim 10 comprising an air pump configured to provide the air into the anti-dripping system as a function of a voltage applied to the air pump.

15. The anti-dripping system according to claim 1, wherein the pumping element and the foaming element are in line with each other.

16. The beverage system according to claim 10, wherein the pumping element and the foaming element are in line with each other.

17. The anti-dripping system according to claim 1, wherein the relative movement of the two parts in the direction pumps the air from the air entry into the processing compartment.

18. The beverage system according to claim 10, wherein the relative movement of the two parts in the direction pumps the air from the air entry into the processing compartment.

19. The anti-dripping system according to claim 1, wherein the movable part and the static part drive the fluid together with the air through the gap.

20. The beverage system according to claim 10, wherein the movable part and the static part drive the fluid together with the air through the gap.

* * * * *